Sept. 15, 1931.   H. N. BOWMAN   1,823,678
CABINET FOR PORTABLE TESTING APPARATUS
Filed Jan. 27, 1930
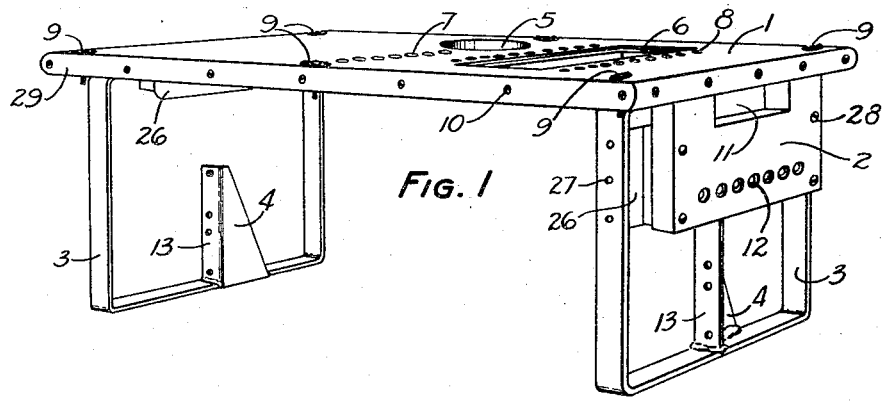
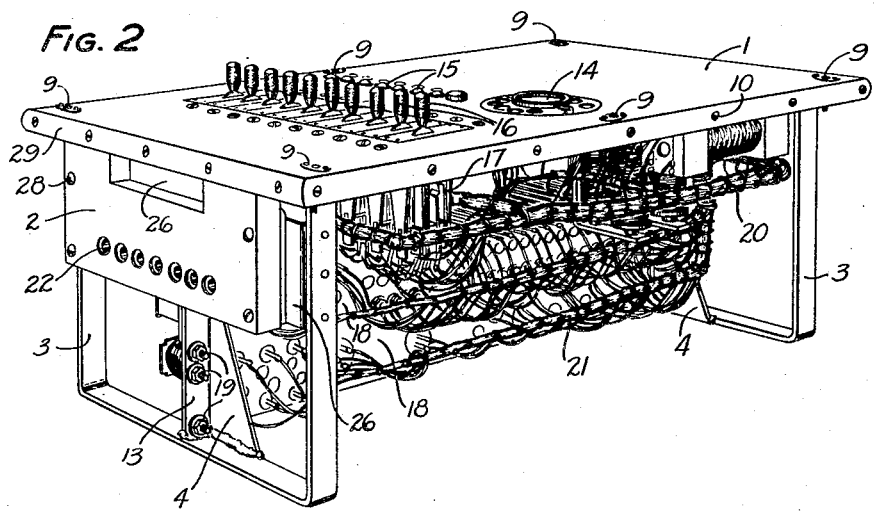
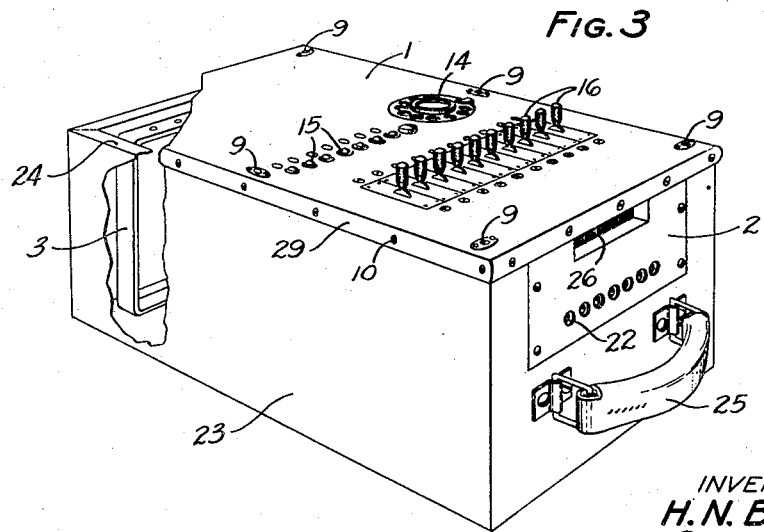
INVENTOR
H. N. BOWMAN
BY P. C. Smith
ATTORNEY Patented Sept. 15, 1931

1,823,678

UNITED STATES PATENT OFFICE

HERMAN N. BOWMAN, OF NEW YORK, N. Y., ASSIGNOR TO BELL TELEPHONE LABORATORIES, INCORPORATED, OF NEW YORK, N. Y., A CORPORATION OF NEW YORK

CABINET FOR PORTABLE TESTING APPARATUS

Application filed January 27, 1930. Serial No. 423,877.

This invention relates to cabinets and more particularly to a cabinet for housing electrical apparatus for testing and exercising electrical circuits and equipment.

Cabinets used for this purpose usually have an exposed top panel on which are mounted keys, levers, meters, lamps and other controlling and indicating devices necessary for making tests and denoting their progress. The remainder of the apparatus is contained in the casing, along the sides or bottom thereof, and wired to the top panel equipment. This location and distribution of the apparatus in the casing, while satisfactory from an operating standpoint, cause considerable difficulty whenever the tester desires to watch the performance of certain parts or the whole of the testing apparatus or otherwise wishes to correct adjustments, make replacements or locate faults within the test apparatus. In such cases it is necessary to remove the top panel in order to expose the apparatus to view and, when this is done, the unity of the top panel control equipment with the apparatus in the casing is disturbed. It sometimes happens that when this is attempted the wires on the lugs of the various pieces of apparatus become loose or broken and, should the tester be concerned with locating a fault, the condition he is looking for may be further obscured and complicated, if not entirely lost.

The object of this invention is to make such improvements in the location, arrangement and distribution of the apparatus within the casing as to make it possible to remove the top panel with all the apparatus thereunder attached as an integral whole from the casing. A further object of the invention is the spacing of the apparatus away from the bottom and sides of the casing so that greater freedom and flexibility may be permitted in handling and transporting the cabinet without danger of injury to the adjustment, wiring or apparatus.

In accordance with the invention, one embodiment of which is illustrated herein by way of example, two E-shaped brackets are suspended by their outer arms at either end of the under side of the top panel. To the inner arms of these brackets are fastened plates which mount the apparatus and, at the same time, provide lateral rigidity to the brackets themselves. At one end of the top panel and positioned vertically with relation to it is a smaller panel for mounting whatever means are necessary for making physical connection between the testing apparatus and the apparatus to be tested. The keys, dials, meters, lamps and other controlling devices are mounted, as formerly, on the top panel.

By this construction and arrangement it is possible to lift the top panel with the attached apparatus and connecting means out of the casing as a unit and stand it on the base of the E-shaped brackets as a support. The whole testing unit is thus exposed to view and the tester may conduct unhampered and with perfect vision whatever tests, adjustments or repairs he desires to make. The E-shaped brackets also serve as a guide or centering device when the unit is replaced in the casing. Also, since the apparatus is now detached from the bottom and sides of the casing and considerable space exists between these panels and the protruding edges of the equipment, greater freedom and ease in handling the whole cabinet is permitted without danger of injury to adjustments, wiring or apparatus.

A clearer conception of the scope and purpose of the invention will be obtained from a consideration of the following description, taken in connection with the attached drawings, in which Fig. 1 is a perspective view of the top and side panels with the E-shaped brackets attached to the under side of the top panel;

Fig. 2 is a perspective view of the top and side panels with apparatus mounted on the top panel and jacks on the side panel, E-shaped brackets and apparatus mounting plates attached thereto and a view of the terminal side of the apparatus mounted on the plates together with the associated cable to which the apparatus is wired;

Fig. 3 is a perspective exterior view of the inclosing case with the unit of Fig. 2 inclosed therein. A portion of the rear section of the case is cut away to show how the outer arm of one of the E-shaped brackets bears against the top edge of the case.

Referring now to Fig. 1 the top panel is shown at 1 to the under side of which at each end is attached by screws or other suitable means a substantially E-shaped bracket 3. Each bracket is provided with a central arm 13 extending upwardly from the base of the bracket and braced by a web 4 formed integrally therewith, both the arm and web being secured to the base of the bracket by welding or in any other suitable manner. Each arm 13 is drilled for the reception of screws by means of which the vertical plates 18, shown in Fig. 2 may be attached thereto. The plates 18 when so attached, not only perform the function of supporting the apparatus of the test box but also serve the additional purpose of giving lateral rigidity to the brackets 3. To each outer arm of one of the brackets 3 adjacent to its junction with the top panel 1, an angle member 26 is attached by screws 27 for supporting the side panel 2. The side panel 2 may be attached to the angle members 26 by screws 28.

The top panel 1 is made of any durable insulating material such as wood or phenol fibre, or preferably a combination of any two such substances wherein the wooden member or its substitute forms the core with a tabular sheet of phenol fibre of suitable thickness, or its substitute, cemented or otherwise fastened to both sides thereof. The use of a wooden core is particularly desirable where screws are used to fasten the E-shaped brackets to the under side of the top panel as described hereinafter. A coat of waterproof paint is applied around the edges of the combination to protect the wooden core from absorbing moisture and warping. The edges of the panel are further protected against collision and possible injury by a metal molding 29 extending around the ends of the top panel 1 and secured thereto by screws or nails 10.

The top panel is provided with openings and drilled for attachment thereto of apparatus and visual signal equipment to be used in operating and controlling the circuits of the test cabinet and for displaying the progress of the operation thereof. In the embodiment of the invention herein described, such typical drillings for the apparatus mounted on the top panel of Fig. 2 as more particularly described hereinafter are designated at 5, 6, 7 and 8. At each of the four corners of the top panel and in the middle of each side thereof a screw 9 is provided for fastening the unit into the inclosing case 23, Fig. 3.

The side panel 2 is made of suitable insulating material and has inserted therein a plurality of drillings 12 in which are positioned jacks 22 as illustrated in Fig. 2 for the attachment of patching cords for connecting the test cabinet with an outside source of operating current and with the apparatus to be tested. A rectangular opening 11 is provided as a hand-hole in the center of the upper end of the panel for grasping the unit when it is to be lifted out of the case 23, Fig. 3, or otherwise carried or moved about. To this hand-hole is attached a rectangular hand-hold member 26, Fig. 2, extending within the unit and having a depth which limits the insertion of the hand so as to prevent any injury either to the hand or to the apparatus and wiring when grasping the unit. There is no side panel at the left end of the top panel but a similar rectangular hand-hole member is furnished thereat in order to provide a hand-hole and similar protection to that described above at that end. The rear end of this hand-hole cover is shown at 26.

Fig. 2 is a perspective view of the top and side panels 1 and 2 with apparatus mounted on the top panel, E-shaped brackets and apparatus mounting plates attached thereto, together with a rear view of the apparatus mounted on the plates 18 and connected to the associated wiring cable. The equipment shown in the illustration is of the kind ordinarily used in electrical circuits for testing telephone circuits and equipment. A dial 14 is shown in opening 5 of Fig. 1; lamps 15 in certain of the openings 7 while a group of lever type keys 16 occupies one of the openings 8. The contacts and terminals of keys 16 extend below the top panel and are shown at 17. On the apparatus plates 18 is mounted other apparatus of the test box (not shown) which is suitably connected to the apparatus carried by the panel 1 and to the jacks 22 of panel 2 by the cables 20 and 21.

Fig. 3 shows the enclosing case 23 with a portion of the rear section cut away to disclose the manner in which one of the E-shaped brackets of the unit is related to the top edge of the case when the unit shown in Fig. 2 is enclosed within the case. The case itself may be made of either wood, metal, or other durable material capable of withstanding severe usage. A rectangular section of proper dimension is cut away on its right face to fit the side panel 2 when the unit is enclosed within the case and a similar, though smaller section, is cut away at the other end to fit the rectangular hand-hole cover 26 provided thereat.

Along the top edges of the case a metal strip 24 is provided whose width is of a dimension such that, when the unit is to be lowered into the case, there is just enough clearance between the outer surfaces of the E-shaped brackets 3 and the inner edge of t...

the strip to permit the unit to slide into place with little or no forward or backward play. This protects the apparatus on the plates and the wiring cable from being jarred against the sides of the case when the unit is being lowered therein. The metal strip 24 is also threaded at proper intervals for registering with the screws 9 on the top panel for fastening the unit to the case. A hand grip 25 is provided on the right face of the case for manual transportation.

When it is desired to use the test box it is carried to the apparatus to be tested and connected thereto by means of patching cords inserted into the jacks 22. The controlling keys 16 and dial 14 are then manipulated by the tester. If it is desired to expose the testing apparatus, all that is necessary is to remove the patching cords, if any are attached, loosen the screws 9, seize the top panel by the hand-holes and lift it out of the case. The unit may then be supported on the E-shaped brackets 3 as a base and manipulated as before.

What is claimed is:

1. In an apparatus cabinet, a cover panel, two inverted E-shaped brackets attached by their outer arms to the under side of said panel, one at each end thereof, one or more apparatus plates supported upon the inner arms of said brackets, and an enclosing casing, said brackets serving as guides for insertion into said casing and as supports when said casing is removed.

2. In an apparatus cabinet comprising a detachable cover panel and an enclosing casing, a metal strip secured along the top edges of said casing and two inverted E-shaped brackets attached by their outer arms to the under side of said panel, one at each end thereof, said brackets in combination with said metal strips serving as guides for inserting said E-shaped brackets attached to said panel into said casing.

3. In an apparatus test cabinet, a cover panel, apparatus mounted on said panel, two inverted E-shaped brackets attached by their outer arms to the under side of said panel, one at each end thereof, one or more apparatus mounting plates supported upon the inner arms of said brackets, apparatus mounted on said plates, a cable operatively connecting said apparatus on said cover panel with apparatus on said plates, a side panel secured to the outer arms of one of said E-shaped brackets, and a plurality of jacks carried by said side panel and operatively connected by said cable to said apparatus on said cover panel and to said apparatus on said mounting plates.

4. In an apparatus cabinet, a cover panel, an enclosing casing, two inverted brackets attached by their outer arms to the under side of said panel, one at each end thereof, a side panel secured to the outer arms of one of said brackets, and two rectangular hand-hole members one at each end of the under side of said cover panel, said side panel being cut away for access to that one of said hand-hole members at the end where side panel is attached.

5. In a telephone apparatus test cabinet, a cover panel, two inverted E-shaped brackets attached by their outer arms to the under side of said panel, one at each end thereof and one or more apparatus mounting plates supported upon the inner arms of said brackets.

6. In a telephone apparatus test cabinet, a cover panel, an enclosing casing, two inverted E-shaped brackets attached by their outer arms to the under side thereof, one or more apparatus mounting plates supported upon the inner arms of said brackets, apparatus mounted on said plates, a cable, and apparatus mounted on top of said cover panel and operatively connected to apparatus on said mounting plates by said cable.

In witness whereof, I hereunto subscribe my name this 24th day of January, 1930.

HERMAN N. BOWMAN.